Patented July 31, 1945

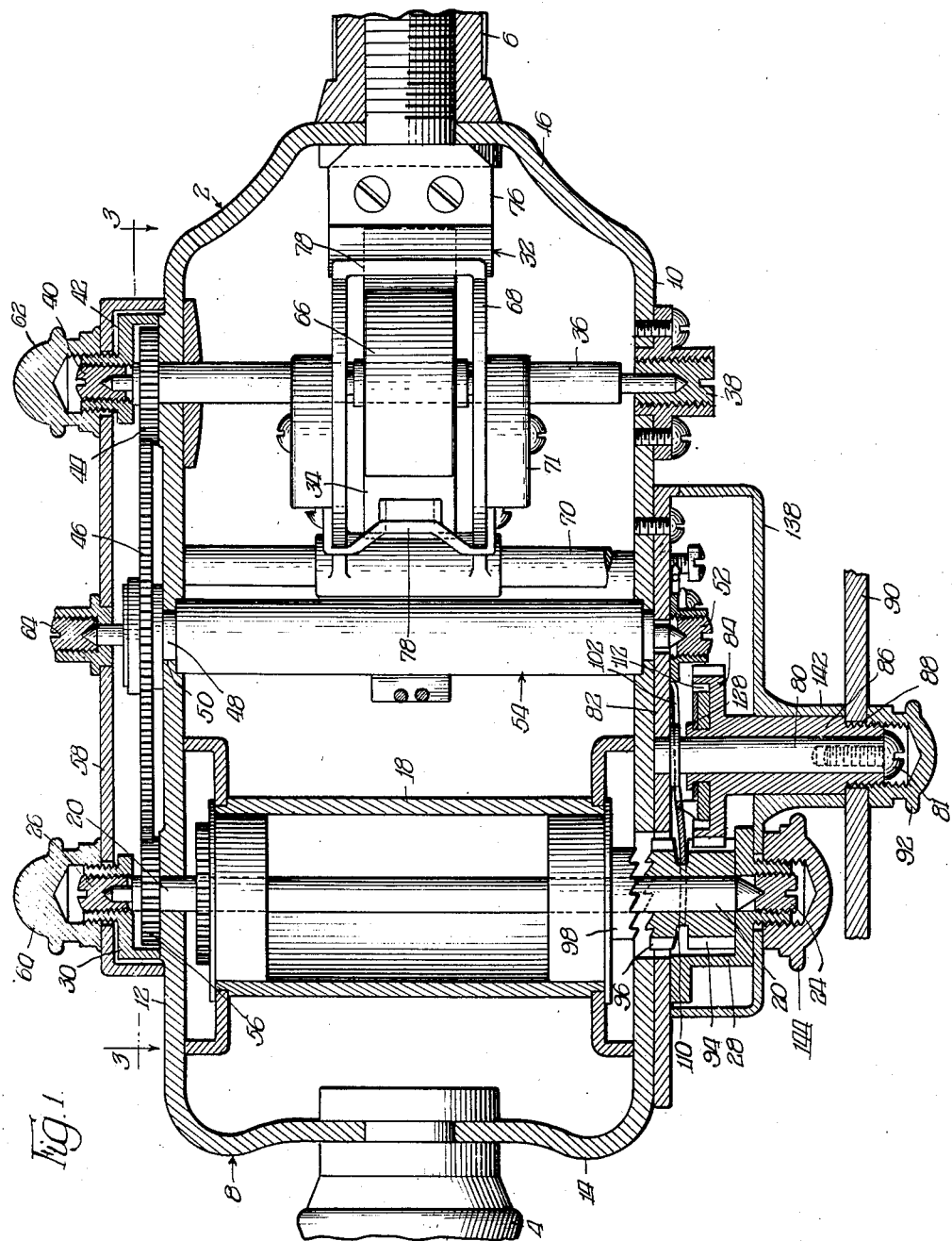

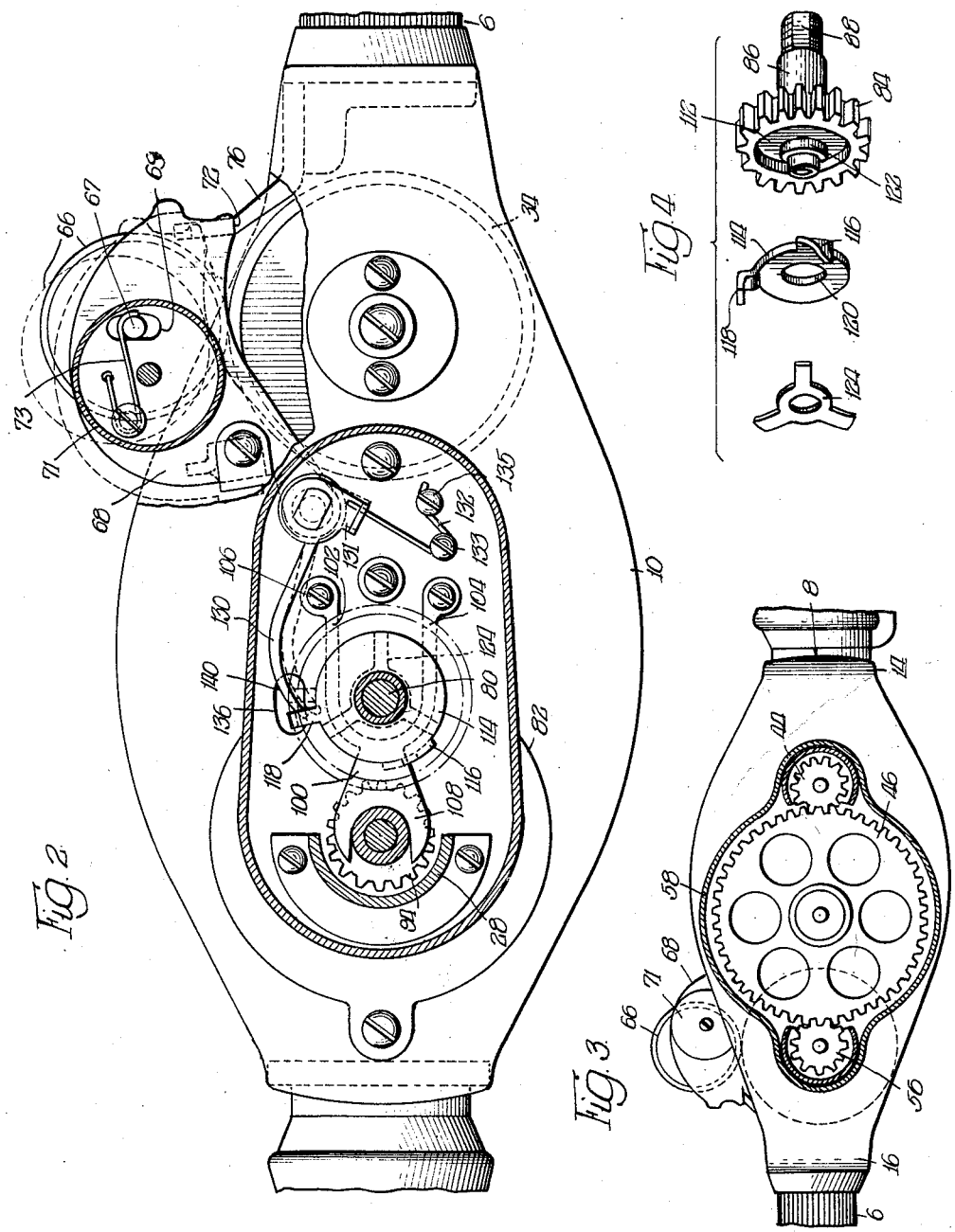

2,380,671

UNITED STATES PATENT OFFICE 2,380,671

FISHING REEL

Noble A. Nelson, Chicago, Ill., assignor of one-fifth to Harold Freevol, one-fifth to Sam Smedberg, one-fifth to Howard Brandon, and one-fifth to Carl E. Anderson Application March 25, 1944, Serial No. 528,100

12 Claims. (Cl. 242—84.1)

The present invention relates to fishing reels, and more particularly to improvements in such reels as shown in my co-pending application Serial No. 499,602, filed August 23, 1943.

Among the objects of the present invention is to provide novel means in a reel structure provided with a line conveyor which will free the line between the cooperating rolls of the line conveyor during a retrieving operation.

Another object of the present invention is to provide mechanism in a reel assembly having a line conveyor for releasing the line between the rolls of said line conveyor during a retrieving operation and which mechanism is controlled by the operating mechanism for the spool.

The present invention is predicated primarily upon a novel reel mechanism which embodies a line conveyor in combination with a spool which is entirely free from operative relation with its operating mechanism during a casting operation and, accordingly, the present invention has as a further object the idea of providing means controlled and actuated by such spool operating mechanism for moving one of the rolls of the conveyor with respect to the other to release the line during a retrieving operation when the operating mechanism for the spool is operatively engaged therewith.

In its more particular aspects the invention contemplates the provision of a pivotally mounted idler roll normally spring pressed into cooperative engagement with the driving roll of the conveyor and which has means associated therewith and operable to move the idler roll to release the line when the operating mechanism for the spool is engaged therewith for retrieving the line, the said mechanism including means for moving the idler roll into cooperative relation with the driving roll upon disengagement with the operating mechanism for the spool.

Other objects, features, capabilities and advantages are comprehended by the invention, as will later appear and as are inherently possessed thereby.

Referring to the drawings—

Figure 1 is a view partly in section and partly in plan of a fishing reel made in accordance with the present invention;

Figure 2 is a view partly in section and partly in elevation of the reel shown in Figure 1 of the drawings;

Figure 3 is a view partly in section and partly in elevation taken in the plane represented by line 3—3 of Figure 1 of the drawings; and Figure 4 is an exploded view of certain of the operating parts for the spool operating mechanism.

Referring now more in detail to the drawings, a reel embodying the improvements according to the present invention is represented generally by the reference numeral 2 and which reel is formed as an element in an assembly which further includes a handle 4 and a ferrule 6 adapted to receive the end of a casting rod which is socketed therein. More particularly, the said reel embodies a frame generally referred to as 8 and having the side plate elements 10 and 12 and the end walls 14 and 16 in which the handle and ferrule are respectively mounted. The said reel is further constituted by a spool 18 fitting within the frame members 10 and 12 and which is provided with the spindle 20 journaled as at 24 and 26, respectively, in the bearing or housing elements 28 and 30. The spool 18 is adapted to receive line used in fishing, to store the same, and to facilitate the paying out and retrieving of the same during a casting operation.

As is well known at the present time, conventional fishing reels are subject to certain objections, one being the fact that because of overrun of the spool during the casting operation the line becomes snarled and entangled, causing considerable difficulty to the user in straightening the line to permit further casting therewith.

The present reel assembly includes improved mechanism to prevent overrunning of the spool and, accordingly, such mechanism acts to completely avoid back-lash of the line on the spool during the casting operation. Such means is constituted by a line conveyor, generally referred to as 32, including a roll 34 mounted upon a shaft 36 disposed transversely of the reel and being journaled as at 38 in the side plate 10 and as at 40 in the housing 42 connected to the side plate 12. Mounted upon the end of the shaft 36 adjacent the side plate 12 is a pinion gear 44 meshing with the gear 46 mounted upon shaft 48 which is mounted as at 50 in plate 12 and as at 52 in side plate 10 and which constitutes the drive for a level winding mechanism generally referred to as 54. The gear 46 is in meshing relation with pinion 56 mounted upon the end of spindle 22 so as to complete a driving connection between the spool 18 and the roll 34 when the spool is operated by mechanism to be hereinafter more fully described.

The driving connection immediately hereinabove described is enclosed within a housing 58 having openings for the bearings 28 and 40 which are enclosed by way of the caps 60 and 62 for holding the housing 58 in position and for protecting the bearings against dirt and accumulations of other materials. Housing 58 likewise provides a bearing element 64 for shaft 48 of the level winding mechanism.

The line conveyor further includes an idler roll 66 provided with shaft 67 movably mounted in slot 69 of housing elements 71 forming a part of a frame 68 secured to the shaft 70 which is pivotally mounted in the side plates 10 and 12. The roll 66 is spring pressed into operative relation with the roll 34 by means of springs 73 mounted in the housings 71 and engaging the ends of shaft 67. The frame 68 is provided with abutment shoulders, such as 72, engageable with similar shoulders on the frame 76 connected to the end wall 16 adjacent the driving roll 34 to hold the idler roll 66 in driving relation to the driving roll 34. Frame 76, as well as the frame 68, is formed with line guide openings, such as 78, for receiving the fishing line in substantially a straight line from the spool 18 to assure proper paying out and retrieving of the fishing line during a casting operation.

While the invention is not limited in respect to the specific diameters of the rolls 34 and 66, or the ratio between the said diameters, nevertheless it has been found that efficient results can be secured by making the diameter of the roll 34 substantially equal to the diameter of a full line spool. That is to say, the diameter of the roll 34 is equal substantially to the diameter of a normal amount of line wound upon the spool 18 for normal fishing undertakings. The roll 66 need not be of any particular diameter and any diameter may be selected which will give the desired results. As will be clearly apparent, under full line spool conditions the lineal speed of the rolls 34 and 66 is substantially equal to the lineal speed of the line on the spool 18. During the paying out of line in a casting operation, the line diameter upon the spool 18 decreases and since the pinions 44 and 56 have equal pitch diameters, the lineal speed of the line through the line conveyor is at all times substantially the same or greater than the lineal speed of the line leaving the spool 18. This condition is desirable in order to maintain the line between the line conveyor and the spool taut under such circumstances, thus rendering it impossible to secure back-lash conditions with the resulting entanglement of the line on the spool 18.

As hereinabove described, the present invention contemplates operating mechanism for the spool which is normally disengaged from the said spool during paying out of the fishing line, but which is engageable therewith for retrieving line during the completion of a casting operation. Such mechanism is shown as comprising a stub shaft 80 connected to the plate 82 secured to the side frame member 10 and which stub shaft has gear 84 mounted thereon. This gear 84 has the threaded extension 86 which embraces the shaft 80 and is held in place by the screw 81. The extension 86 is provided with a non-circular shoulder part 88 adapted to receive the handle 90 for rotating the gear. The handle 90 is secured to the sleeve extension 86 through the medium of the cap screw 92. The gear 84 is adapted to mesh with a pinion 94 rotatably and slidably mounted upon the end of the spindle shaft 20 and which pinion is formed integral with a clutch element 96. The clutch element 96 is formed with teeth on its inner face adapted to mesh with similar teeth on the face of a clutch element 98 connected to the spool 18, thus providing for a driving connection between the handle 90 and the spool 18.

The operating mechanism is so constructed and arranged that the clutch element 96 engages the clutch element 98 upon application of pressure to the handle 90 and to automatically become disengaged therefrom upon release of pressure on the handle 90. This operation is effected through the provision of a leaf spring 100 bifurcated to provide the arms 102 and 104 at one end which straddle the shaft 80 and are connected to the plate 82 by screws, or the like, 106. The other end of the spring element 100 is bifurcated to form the arms 108 adapted to enter into the slot 110 provided between the pinion 94 and the clutch element 96 and to embrace the intermediate hub formed therebetween, the said spring being constructed and so mounted on the plate 82 as to normally urge the clutch element 96 out of engagement with the clutch element 98. Accordingly, during a casting operation the spool operating mechanism is wholly disengaged from the spool 18 so as to provide a free running spool during the paying out of line from the reel.

However, upon initiating a retrieving operation the spring 100 is moved inwardly to effect an engagement between clutch elements 96 and 98 whereby the spool 18 may be rotated to retrieve the line. The mechanism herein disclosed for effecting this movement of the spring 100 is incorporated within the recess 112 formed in the face of gear 84, all as clearly shown in Figure 4 of the drawings. The said mechanism comprises a disk 114 formed with a cam 116 and a lug 118 projecting from one face thereof adjacent its periphery, which disk 114 is formed with an opening 120 fitting over the hub 122 projecting into the recess 112. Likewise, mounted over the hub 122 is a spider-like spring washer 124 engaging the face of the disk 114. The disk 114 and spring washer 124 are held in assembled relation to gear 84 by the spun end 128 of the hub 122. The disk 114 frictionally engages the end wall of the recess 112 so that in any position of the disk 114 the gear 84 is free to rotate to operate the pinion 94 and in turn the spool 18.

As hereinbefore suggested, the lineal speed of the rolls 34 and 66 is equal to or greater than the lineal speed of the line being paid out from the spool 18 during a casting operation. It will be further apparent that when the line is being retrieved, constant engagement of the rolls 34 and 66 would cause the line to be fed to the spool 18 at a greater rate than it could be wrapped or wound upon the spool. This would be due to the greater lineal speed of the rolls 34 and 66 over the lineal speed of the line wound upon the spool 18 and would cause slack line to appear between the spool and the line conveyor if some provision were not made to correct such action. The present assembly is particularly characterized by certain novel features of construction which prevent this condition from occurring and which allow the line to be wound smoothly and with the necessary degree of firmness upon the spool and in such a condition that the next casting operation can be made without difficulty. As previously indicated, the idler roll 66 is pivotally mounted in the frame members 10 and 12 through the medium of the shaft 70 to permit the idler roll 66 to be moved relative to the driving roll 34 to completely disengage the line therefrom during a retrieving operation. In order to move the idler roll about its pivot point, a cam lever 130 is mounted on the inner end of the shaft 70 extending through the frame member 10. This cam lever is provided with the extension 131 engaged by one end of a spring 132 which extends about the abutment screw 133 and has its other end engaging the abutment screw 135. Thus the spring 132 tends to rotate shaft 70 in a clockwise direction, as viewed in Figure 2 to maintain rolls 34 and 66 in frictional engagement with the line. The lever arm 130 extends in the direction of the operating mechanism for the spool and terminates in line of movement of the lug 118 of the disk 114 which lug extends within the recess 136 provided in the plate 82 and which opening is adapted to limit the movement of said disk 114 during its normal reciprocal movement. However, the said lug 118 is adapted to engage the cam surface 140 provided on the lever arm 130 when disk 114 is rotated to cause a depression of spring 100 through the medium of the cam 116 so that arm 130 is moved counter-clockwise to rotate frame 68 and the roll 66 as the clutch element 96 is moved into engagement with the clutch element 98. The idler 66 is, accordingly, moved away from the driving roll 34 to completely release the line during a retrieving operation so that there is no possibility of the line being loosely wound upon the spool 18 due to the over-driving relation of the conveyor rolls with respect to the spool upon a retrieving operation.

Upon release of the handle 90 the cam 116 is moved through the medium of spring 132, lever arm 130 and lug 118 of disk 114 to release spring 100 to cause disengagement of the clutch elements 96 and 98 and at the same time to permit clockwise movement of arm 130 to return the idler roll 66 to its frictional engagement with the line.

It is therefore clearly apparent that frictional engagement of the rolls 34 and 66 with the line is maintained when clutch elements 96 and 98 are disengaged and line is being paid out from the reel under free spool conditions, but that when the clutch elements 96 and 98 are interengaged during a retrieving operation, idler roll 66 becomes released from its frictional engagement with the line to permit the line to be retrieved onto spool 18 without fear that the same will become snarled or otherwise loosely wound on the spool. In passing, it may be stated that sufficient drag is usually applied to the line through the plug or fish to cause the line to be taut for retrieving onto the spool 18.

The operating mechanism for the spool, as well as the idler roll, is adapted to be enclosed within a housing 138 having a central hub 142 embracing the extension 86 of gear 84. The bearing 24 extends through a suitable opening in the housing 138 and is enclosed by cap screw 144 which also holds housing 138 in rigid position with respect to the reel frame.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. In a fishing reel, the combination of a frame, a spool operatively mounted for rotation in said frame, a line conveyor comprising opposed rolls spaced from said spool and adapted to frictionally grip line from said spool, a driving connection between said spool and at least one of said rolls, operating mechanism for said spool, and means controlled by said operating mechanism for moving one of said rolls with respect to the other to release said frictional engagement of said line during the retrieving of said line onto said spool.

2. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler movable with respect to said driven roll, operating mechanism for said spool, and means controlled by said operating mechanism for moving said idler roll with respect to said driven roll to release said frictional engagement of said line during the retrieving of said line onto said spool.

3. In a fishing reel, the combination of a frame, a spool operatively mounted for rotation in said frame, a line conveyor comprising opposed rolls spaced from said spool and adapted to frictionally grip line from said spool, a driving connection between said spool and at least one of said rolls, operating mechanism for said spool including a clutch normally disengaged from said spool during a casting operation and normally engaged during the retrieving of line onto said spool, and means operable in accordance with the operation of said operating mechanism to move one of said rolls with respect to the other to release said frictional engagement of said line during the retrieving of said line onto said spool and to return said roll to its normal line engaging position during a casting operation.

4. In a fishing reel, the combination of a frame, a spool operatively mounted for rotation in said frame, a line conveyor comprising opposed rolls spaced from said spool and adapted to frictionally grip line from said spool, a driving connection between said spool and at least one of said rolls, operating mechanism for said spool including a clutch normally disengaged from said spool during a casting operation and normally engaged during the retrieving of line onto said spool, and means operable in accordance with the operation of said operating mechanism to disengage said rolls upon engagement of said clutch and to return said line engaging relation of said rolls upon disengagement of said clutch.

5. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler movable with respect to said driven roll, operating mechanism for said spool including a clutch normally disengaged from said spool during a casting operation and normally engaged during the retrieving of line onto said spool, and means in accordance with the operation of said operating mechanism to move said idler roll out of driving frictional engagement with said line upon engagement of said clutch and to return said idler roll to its line engaging position with respect to said other roll upon disengagement of said clutch.

6. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler, pivotal means for movably mounting said idler with respect to said driven roll, operating mechanism for said spool, and means operated by said operating mechanism for moving said idler roll about its pivot to release said frictional engagement of said line during the retrieving of said line onto said spool.

7. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler movably mounted with respect to said driven roll, operating mechanism for said spool including a spring actuated clutch mechanism for normally disengaging said spool from said operating mechanism, means for actuating said clutch mechanism, spring controlled means for normally holding said idler roll in frictional line gripping relation to said driven roll when said clutch is disengaged, and means interconnecting said control means and actuating means to move said idler roll to release said line when said clutch is engaged.

8. In a fishing reel, the combination of a frame, a spool operatively mounted for rotation in said frame and having a clutch element, a line conveyor comprising opposed rolls spaced from said spool and adapted to frictionally grip line from said spool, a driving connection between said spool and one of said rolls, the other of said rolls constituting an idler pivotally mounted with respect to said driven roll, operating mechanism for said spool including a spring actuated clutch element normally held in disengaged relation to said first named clutch element, said operating means including frictional clutch actuating means, and means interconnecting said clutch actuating means and said pivotal mounting for said idler roll for moving said idler roll to release said line when said clutch is engaged.

9. In a fishing reel, the combination of a frame, a spool operatively mounted for rotation in said frame and having a clutch element, a line conveyor comprising opposed rolls spaced from said spool and adapted to frictionally grip line from said spool, a driving connection between said spool and one of said rolls, the other of said rolls constituting an idler pivotally mounted with respect to said driven roll, operating mechanism for said spool including a spring actuated clutch element normally held in disengaged relation to said first named clutch element, said operating means including cam means for actuating said clutch, spring controlled lever operating means for rotating said pivotal mounting for said idler roll, and means operable in accordance with said cam means for operating said lever means to move said idler roll to release said line when said clutch is engaged.

10. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler pivotally mounted with respect to said driven roll, operating mechanism for said spool including a gear train, said gear train comprising a driving gear and a driven gear movable axially with respect thereto, clutch mechanism between said gear train and spool normally engaged and disengaged by said movable gear, spring means for normally holding said clutch in disengaged relation whereby said spool is rotatable free from said operating mechanism, means frictionally associated with said driving gear for controlling operation of said last-named means and means operated by said means frictionally associated with said driving gear for moving said idler roll to release said line when said clutch is engaged.

11. In a fishing reel, the combination of a frame, a spool operatively mounted for rotation in said frame, a line conveyor comprising opposed rolls spaced from said spool and adapted to frictionally grip line from said spool, a driving connection between said spool and one of said rolls, the other of said rolls constituting an idler pivotally mounted with respect to said driven roll, operating mechanism for said spool including a gear train, said gear train comprising a driving gear and a driven gear movable axially with respect thereto, clutch mechanism between said gear train and spool normally engaged and disengaged by said movable gear, spring means for normally holding said clutch in disengaged relation whereby said spool is rotatable free from said operating mechanism, means frictionally associated with said driving gear for controlling operation of said last-named means, a spring controlled lever arm operatively connected to said pivotal mounting, and said means frictionally associated with said driving gear having means for actuating said lever arm for moving said idler roll to release said line when said clutch is engaged.

12. In a fishing reel, the combination of a line conveyor comprising opposed rolls adapted to frictionally grip line from the spool of said reel, means for driving at least one of said rolls, and means responsive to the operation of said spool for retrieving line onto the same for moving one of said rolls with respect to the other to release said frictional engagement of the line by said rolls.

NOBLE A. NELSON.